United States Patent [19]
Barchus

[11] 3,883,151
[45] May 13, 1975

[54] MEANS FOR GUIDING THE MOVEMENT OF A VEHICLE

[76] Inventor: Oscar W. Barchus, 1247 Mehlview Ct., St. Louis, Mo. 63125

[22] Filed: Sept. 13, 1972

[21] Appl. No.: 288,751

[52] U.S. Cl............ 280/80 R; 280/103; 280/446 R; 280/448
[51] Int. Cl.......................... B62d 7/00; B62d 17/00
[58] Field of Search........ 280/64, 80 R, 103, 446 R, 280/448, 96.2 A

[56] References Cited
UNITED STATES PATENTS

| | | | |
|---|---|---|---|
| 854,212 | 5/1907 | Hartle | 280/64 |
| 1,698,896 | 1/1929 | Synck | 280/103 |
| 2,644,697 | 7/1953 | Peterson | 280/448 UX |
| 2,650,100 | 8/1953 | Ronning | 280/103 |
| 2,674,463 | 4/1954 | Peterson | 280/448 UX |
| 3,549,167 | 12/1970 | Haverbeck | 280/96.2 A |

*Primary Examiner*—Robert S. Ward, Jr.
*Attorney, Agent, or Firm*—Paul M. Denk

[57] ABSTRACT

In a vehicle such as a trailer, carriage, wagon, or the like, the front axle or frame of the vehicle proximate each front wheel assembly includes a first axle which is pivotally mounted thereto and disposed to provide for turning of the wheel, while a second axle pivotally mounts to the first axle to provide for limited wheel shifting forwardly or rearly of the first axle, one of said axles having an angular formation to acquire camber, which camber translates into wheel toe-in due to this pivotal movement of the second axle to thereby facilitate the guidance of said vehicle while being moved in either the forward or reverse direction.

6 Claims, 9 Drawing Figures

MEANS FOR GUIDING THE MOVEMENT OF A VEHICLE

BACKGROUND OF THE INVENTION

This invention relates generally vehicle construction, and more specifically pretains to axle construction for mounting of wheels to combine vehicle camber and toe-in to facilitate vehicle guidance regardless of its direction of movement.

Various types of caster wheel structures for trailer and wagon construction have been provided in the prior art. For example, it is well known that in the manufacture of automobiles, frequently each pair of front or rear tires are furnished with some amount of camber, i.e., where the setting of the wheels are closer together at the bottom than at the top, all for the purpose of facilitating vehicle traction and maneuverability. Other automobile trailer or wagon wheel constructions have considered the desirability of providing means for inducing wheel lag in the direction of wagon movement for the purpose of enhancing, slightly, the guidance of the device when moving either in the forward, but particularly, in the reverse direction. Prior U.S. Pat. Nos., such as the one to Peterson, 2,644,697, or the patent Linn, 1,915,325, describe the attributes of wheel lag in the direction of carriage movement, and particularly disclose various mechanical means for achieving a shift of the wheel structure each time the carriage moves in either a forward or reverse direction.

Also, in some automobile construction, adjustment is provided of the front wheels which may be described as "toe-in" and which provides that the front edges of the wheels are closer together than at their back edges. This feature is apparently desirable in wheel construction so as to maintain a vehicle upon its intended forward direction of travel, and apparently alleviates wavering, swaying, and vibrations during forward travel of the vehicle.

The present invention has as its principal object the providing of means for combining both camber and toe-in in vehicle wheel construction so that its guidance may be enhanced regardless of the direction of travel of the vehicle.

Another object of this invention is to provide a trailer construction in which its front wheels combine both toe-in and camber when moving in a forward direction, but when the trailer is moved in a reverse direction, the toe-in of the wheels is also reversed to thereby enhance the guidance of the device during its movement in this rearward direction.

A further object of this invention is to provide a method for achieving simultaneously both camber and toe-in of vehicle wheels during movement of the trailer, carriage, or the like.

These and other objects of this invention will become more apparent to those skilled in the art in light of the following summary, description of preferred embodiment, when reviewed in view of the drawings.

SUMMARY OF THE INVENTION

This invention comprises a carriage, trailer, wagon, or any other vehicle form of construction which generally includes a pair of front wheels that may be steered for turning in the direction of movement of the vehicle, but also includes structure means that provides for, as previously described, both camber and toe-in for said front wheels so as to facilitate and enhance the self-guidance characteristics of the vehicle, particularly when pushed in reverse. Anyone who has attempted to move a trailer in a rearward direction, such as the common trailer that mounts a boat, or other device, readily understands the difficulty of managing such a maneuver. This problem is compounded when a four-wheeled wagon, trailer, or other equivalent vehicle is shifted in the reverse direction, since the front wheels of such a vehicle must also be guided usually through self-pivoting to provide for directional movement of its back wheels, simultaneously with the reverse movement of the tractor, automobile, or mechanism providing drive to the inert wheeled vehicle. This invention incorporates dually the concept of wheel camber which partially assist in the guidance of the front vehicle wheels, but additionally employs the principle of castering to simultaneously provide toe-in for said wheels regardless whether the vehicle be moving forward or a reverse direction.

The main structure or axle supporting the front wheels of the vehicle of this invention, at each end, has attached thereto for pivotal movement a first axle, which in the preferred embodiment, forms an angle with the ground of slightly lower than the horizontal, so as to provide the desirable camber to the wheels mounted thereto. In addition, another axle is pivotally mounted to the end of each first axle, and though the operation of a stop means, provides for an angular disposition of lag of this wheel axle with respect to the first axle pivotally mounted to the vehicle frame. Hence, the wheel mounted to the end of said second axle will normally be disposed slightly lagging the first axle, and due to this lag of a few degrees, the camber provided in the mounting of the wheel assembly translates partially towards the horizontal furnishing some degree of toe-in of the two front tires with respect to each other. Then, through the cooperation of a camming means loosely mounted around the second axle and the wheel drum mounting to said wheel, a roller arranged between these two parts provides the necessary frictional engagement to achieve this transfer of wheel lag when the vehicle is initially moved in a particular direction, such as when moved from the forward to the reverse direction.

The acquisition of both the camber and toe-in angular dispositions in the pair of front tires of a vehicle of this nature very effectively provides ease of guidance to the vehicle as when being moved, particularly in reverse, and therefore, provides a desirable addition to the vehicle art.

DESCRIPTION OF THE PREFERRED EMBODIMENT

Figure 1:
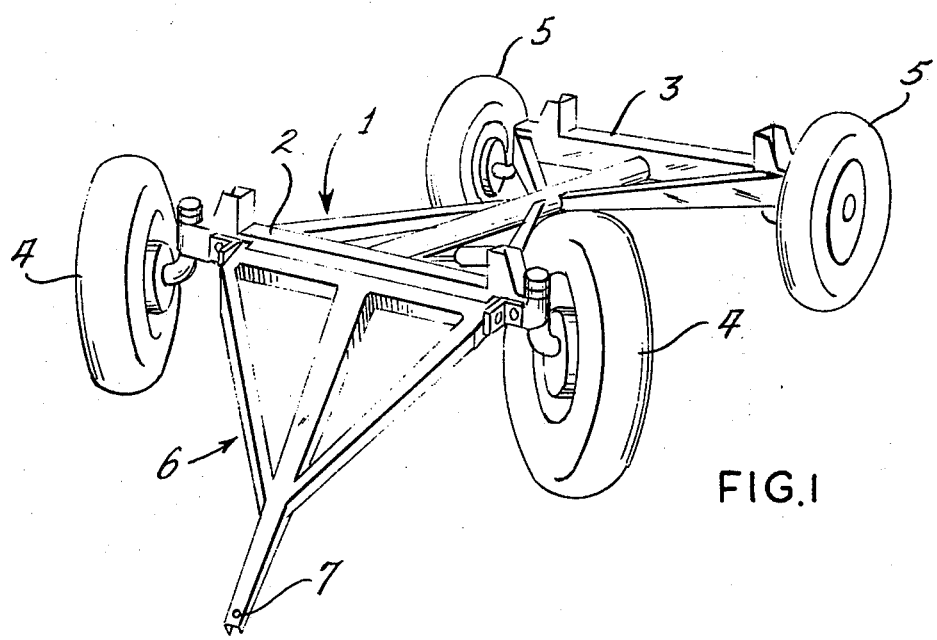
FIG. 1 provides a perspective view of a vehicle or trailer frame having a pair of rear wheels and front wheels connecting thereto, the latter wheels incorporating the principle of this invention.

Referring to the drawings, and in particular FIG. 1, there is disclosed the frame or structure 1 for a carriage or wagon which includes a front axle or cross frame 2 and a rear axle or cross frame 3, each of these cross frames having a pair of wheel assemblies, as at 4 and 5, to provide mobility to the carriage. The carriage may be provided with a forwardly extending beam, as at 6, which may include at its frontal end a hitch 7 for attachment of the carriage to a pulling mechanism, such as a tractor.

Figure 2:
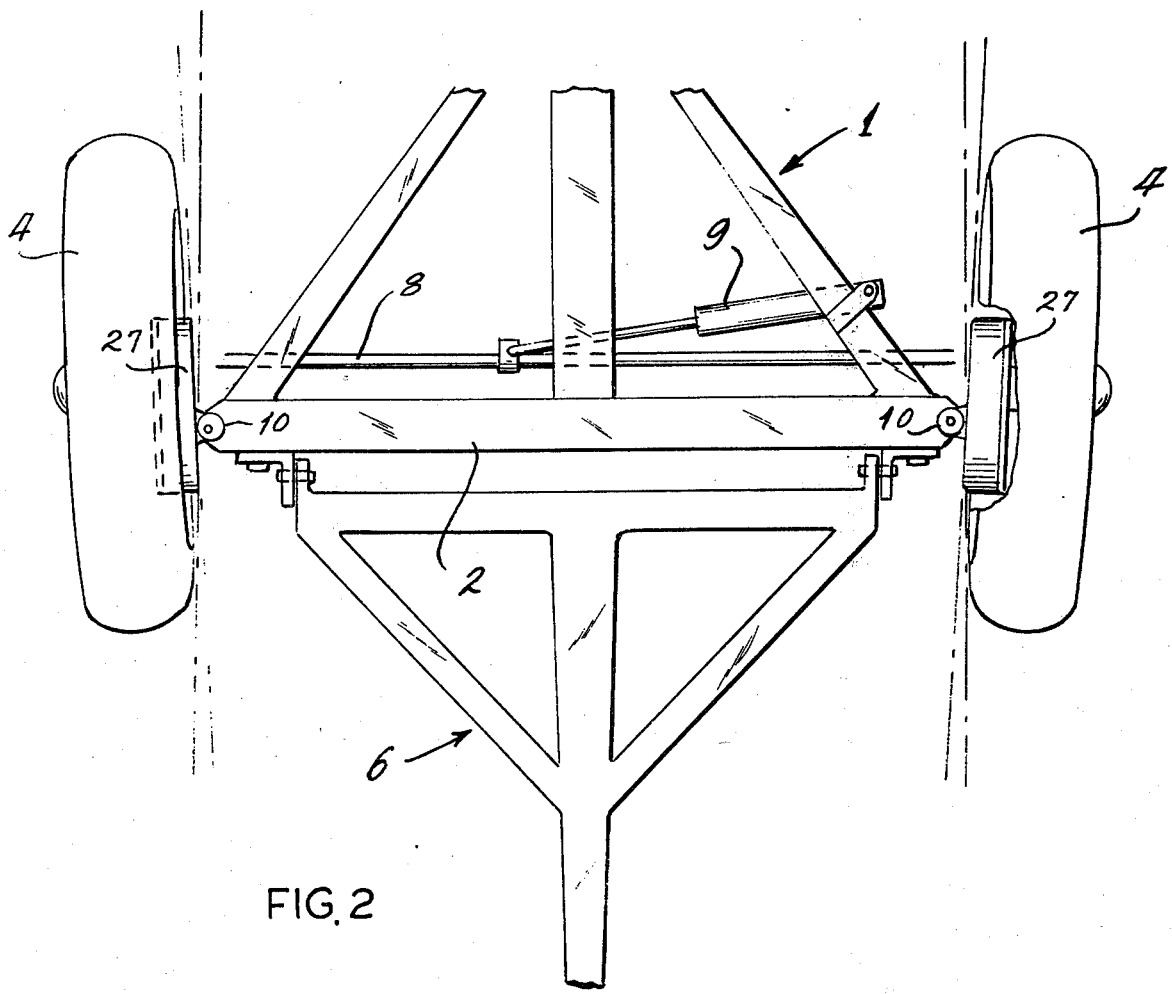
FIG. 2 provides a plan view of the frontal portion of the vehicle of FIG. 1, schematically showing the toe-in and camber relationship of the pair of front wheels of this vehicle.

The principle of this invention in providing the combination of camber and toe-in to the wheels of a carriage, in addition to incorporating the castering effect, in most instances, will be constructed into the pair of front wheel assemblies of any carriage. In the plan view of FIG. 2, the frame 1, and in particularly its front cross frame 2 are shown having the cambered wheels 4 maintaining a slight toe-in towards the front, as when the carriage is being pulled in the forward direction. To stabilize the functioning of these wheels a tie rod 8 spans the distance between the two said wheels, and a stabilizer or shock absorber 9 connects thereto to dampen any structural vibrations during movement of the carriage. Also, the front beam 6 is herein shown being pivotally mounted to the cross frame 2, so as to allow for its upward or downward movement as when it is being hitched to a tractor. But, even in view of the foregoing, the various tie rod, stabilizer, or the mounting of the beam 6 to the cross frame 2 may also be constructed in the usual manner that provides for steering of the front tires 4, as is commonly available in the prior art. For example, the beam 6 may be mounted to the cross frame 2, and connect with tie rods to the wheel assembly 4 so that a lateral movement of the beam 6 will provide for a likewise turning of the wagon wheels as when the carriage is being pulled by a tractor, automobile, or other vehicle.

The principle of this invention, as previously described, is to acquire the combination of cambering and toe-in to the front pair of wheels of a carriage, and to achieve this, each front wheel assembly 4 of the invention combines the use of a pair of designed axles which cooperate to provide both of these attributes in each vehicle wheel. By referring to FIG. 3, it can be seen that the front cross frame 2 is provided with a sleeve like member 10 formed at either end, and inserted within this sleeve is the upper end 11 of a first axle 12, of said pair of axles. This axle end 11 is stabilized within the sleeve 10 by means of an integral shoulder 13, while upon the upward portion of the axle end 11 there is attached a cap 14 which is secured in place by means of a fastener 15. The dimension between the cap 14 and the shoulder 13 of the first axle 12 is of such a distance to provide for the freedom of pivotal movement of said axle end within the sleeve 10 of the front cross frame of the vehicle. Hence, it can be readily seen that the direction of movement of this front right wheel assembly 4 of the vehicle can be directed through the pivoting of this axle 12 with respect to the frame 2. It is to be observed that the description of the wheel assembly and its axles, as shown in FIG. 3, are for the right front wheel of the vehicle, as viewed from the front, while the front left wheel assembly and its axle combination are of identical construction, but the mirror image, operating in principle indentically the described wheel assembly.

The other axle end 16 of the first axle 12 is bent to maintain an angular relationship with respect to the axle end 11, and in the preferred embodiment, the axes of these two axle ends are arranged to form an interior angle of approximately 91°. This angular relationship, as will be more thoroughly described subsequently in the application is what furnishes the camber to the wheel structure, which is useful for facilitating guidance of the carriage during movement. Rigidly attaching to this axle end 16 is a stop means 17 which is formed having shoulder like formations 18, with said stop means being firmly held in place with respect to said axle end by means of a connecting bolt 19. A second axle 20 is formed having a sleeve like member 21 integrally located at its upper end, and this sleeve is designed for pivotally mounting upon the end 16 of the axle 12. The sleeve 21 has an integrally formed portion 22 extending from one side, and this shoulder portion 22 is designed for contacting the shoulder 18 of the stop means 17 so as to limit the extent of pivotal movement of the axle 20. This shoulder portion 22 of the sleeve 21 extends beyond the wheel plate 22a, which is secured to the axle 20. The other end 23 of the axle 20 is formed similar to the axle of any standard carriage or automobile, which includes a series of bearings 24 that mount the wheel frame 25, with said wheel frame having usual lugs 26 that retain a wheel drum 27 and generally the wheel assembly 4 that may mount the usual pneumatic vehicle tire. A wheel nut 28, surrounded by a grease cap, provides the means for securing the wheel frame 25 bearing mounted upon the axle end 23.

Figure 4:
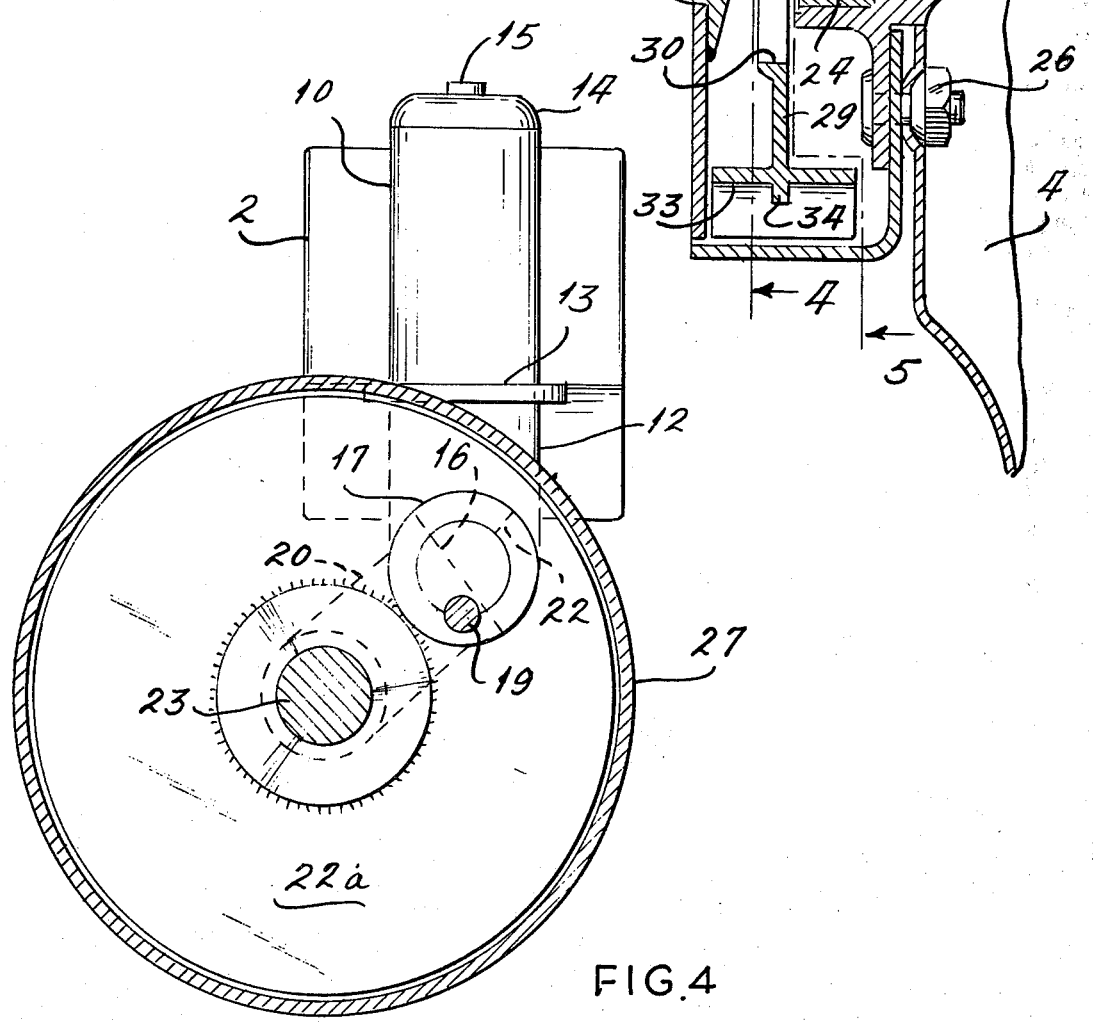
FIG. 4 provides a sectional view taken along the line 4—4 of FIG. 3, showing the lagging position of the wheel when the vehicle is moving in a reverse direction.

A previously described, in this preferred embodiment, the angular relationship between the two ends of the first axle 12 is formed approximately at 91°. On the other hand, the angular relationship between the axis of the end 23 of the second axle 20, and the axis of the end 11 of the first axle 12, is approximately 90°. Hence, when the wheel assembly 4 is maintained vertically in line with the cross frame 2, so that its second axle 20 is disposed neither forwardly or rearwardly of the first axle 12, there is no camber between the wheels 4, and this has been found to ease the shift of the wheels as when the vehicle or carriage changes from movement in the forward to the reverse direction, or vice versa. But, and as shown in FIG. 4, when the wagon, for example, is moving in the reverse direction, the second axle 20 tends to pivot upon the end 16 of the first axle 12, thereby furnishing a lagging positioning of its wheel assembly 4 with respect to said first axle and the cross frame 2 of the vehicle. It is this lagging position that the wheel 4 undertakes with respect to the direction of movement of the vehicle that achieves some degree of camber and toe-in in the direction of vehicle movement, and this is caused due to the slightly greater than 90° angle formed in the first axle 12.

Figure 3:
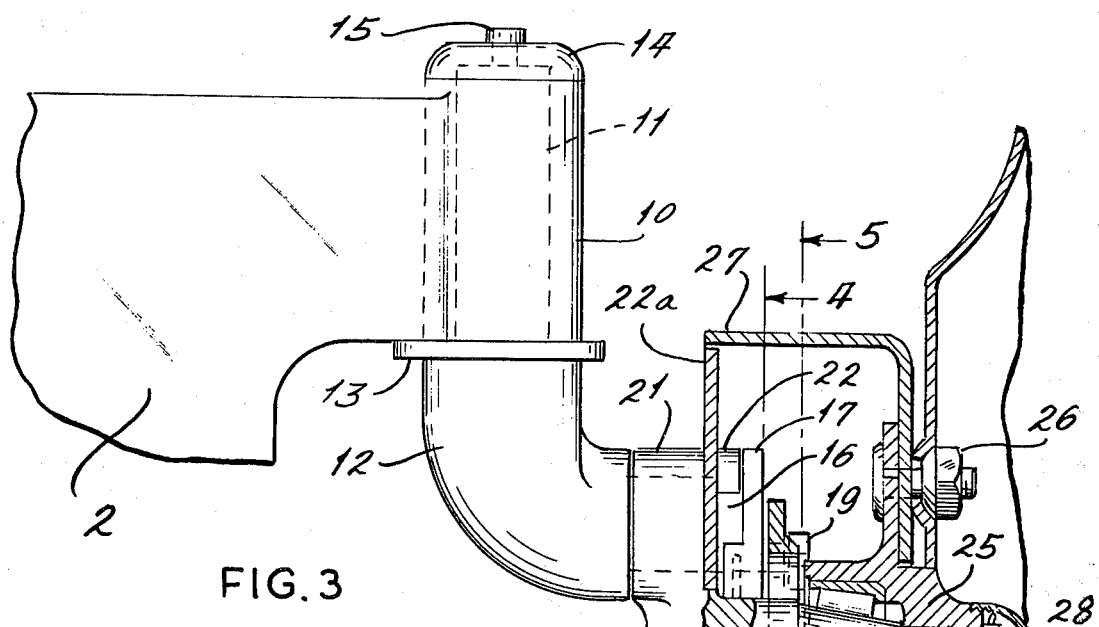
FIG. 3 provides a sectional view taken through the right front wheel structure of FIG. 5, showing the combination of axles of this invention.

Perhaps this angular relationship of the various first and second axles of this invention should be more thoroughly reviewed other than as previously described with respect to the preferred embodiment of this invention as illustrated in FIG. 3. For example, the reason for the use of two axles in this invention is to, first, allow one of the axles to maintain a pivotal relationship with respect to the cross frame 2 of the vehicle, so that the wheels may be turned to provide directional movement for the carriage, and secondly, the second axle is pivotally mounted to the first axle to achieve this lagging condition for disposition of the wheel with respect to the first axle. Hence, either the first axle, or the second axle, may have an interior angular relationship that differs from the 90°, so as to provide a slight camber to its respective wheel, and as the wheel assembly, and more particularly its second axle 20, undertakes some pivot so as to achieve wheel lag, the camber angle is translated somewhat into a horizontal direction so as to achieve some degree of toe-in in the direction of vehicle movement. It becomes very obvious, upon viewing the combination of axles as shown in FIG. 3, that this angular relationship of a few degrees greater than 90° may be formed into either the first axle 12, or the second axle 20, and that these few degrees provide a degree of camber that translates into toe-in of the wheels in the direction of their movement. But, just as the preferred embodiment was described in FIG. 3, it has been found that the particular formation of the angles of the two axles 12 and 20, and their pivotally mounting toether, in the manner as described, provides for no camber of the wheel as the two axles are arranged vertically upright and in alignment, but that the angular relationship described develops into both wheel camber and toe-in as the wheel achieves a position of lag with respect to the first axle 12, during vehicle movement. For example, in the preferred embodiment, where the axles 12 and 20 respectively have interior angles of 91° and 89°, as the wheel assembly lags at a 30° angle, the 18 inches diameter wheel maintains a toe-in and camber of approximately one-eighth inch. But, this invention contemplates both the angular relationships described in the preferred embodiment, in addition to the variations herein described so that the combination of camber and toe-in of the wheels can be achieved simultaneously through wheel lag during vehicle movement. In the later described variations, wheel camber can be designed permanently into the construction of the axle wheel assemblies, for example, by making the interior angle of one axle at greater than 90° while maintaining the interior angle of the other axle just at 90°, whereas in the design of the preferred embodiment, camber may be eliminated when the wheel is standing upright in neither lagging position so as to ease the process of transferring the wheel assembly from a forward position of lag to a rearward position of lag, or vice versa.

Figure 5:
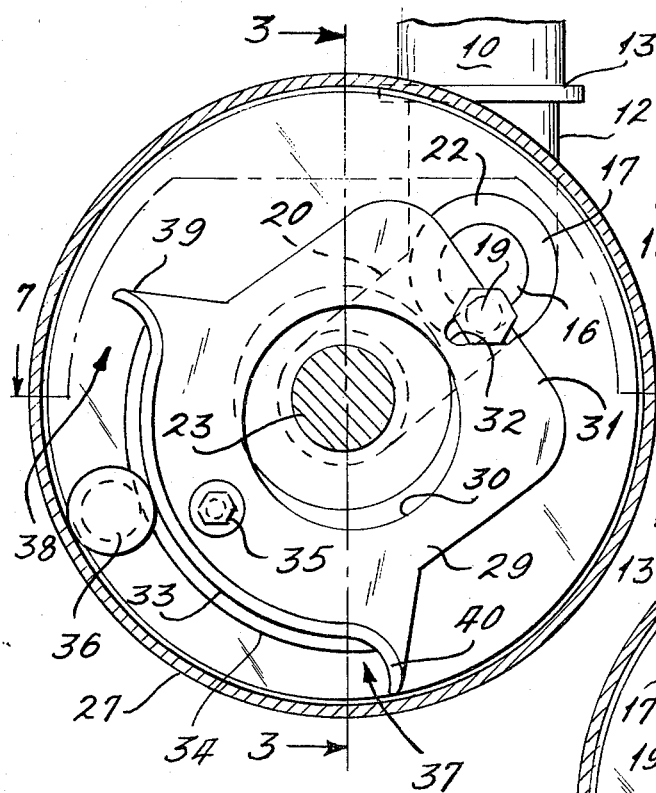
FIG. 5 is a sectional view taken along the line 5—5 of FIG. 3, showing the lagging relationship of the wheel camming member, roller, and drum as the vehicle is moving in a reverse direction.
Figures 8, 9:
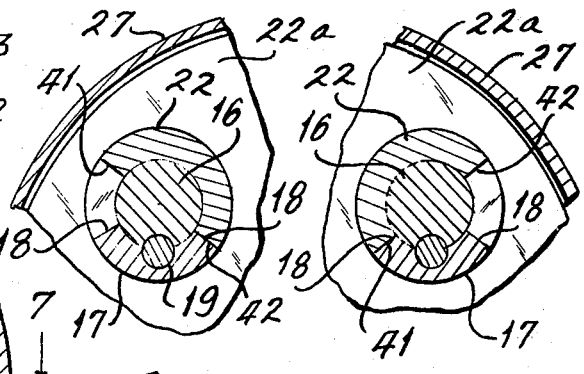
FIG. 8 is a sectional view of the relationship between the stop means cooperating between the first and second axles taken along the line 8—8 of FIG. 7, as when the vehicle is moving in the reverse direction.
FIG. 9 provides a sectional view of the stop means cooperating between the first and second axles of this invention, similar to the view in FIG. 8, but showing the position of the stop means as the vehicle is moving in the forward direction.
Figure 6:
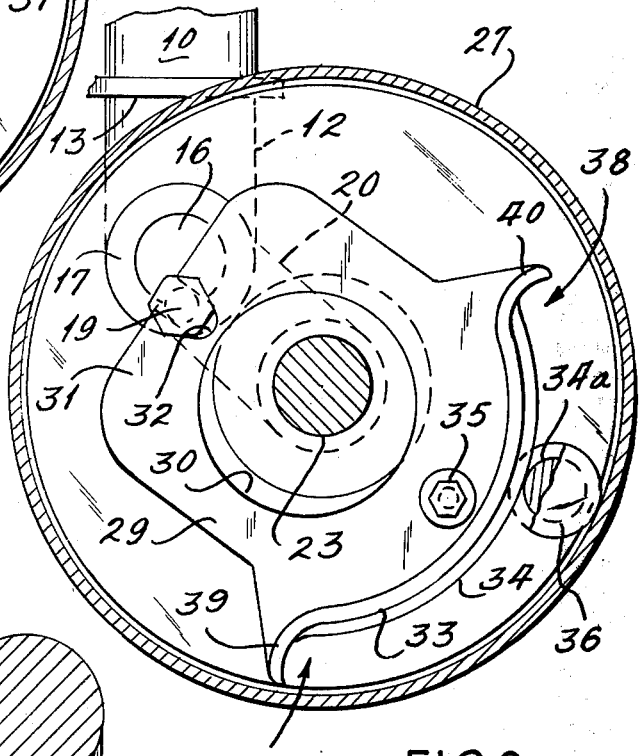
FIG. 6 is a similar sectional view as that of FIG. 5, showing the lagging position of the wheel camming member, roller, and drum as the vehicle is moving in a forward direction.
Figure 7:
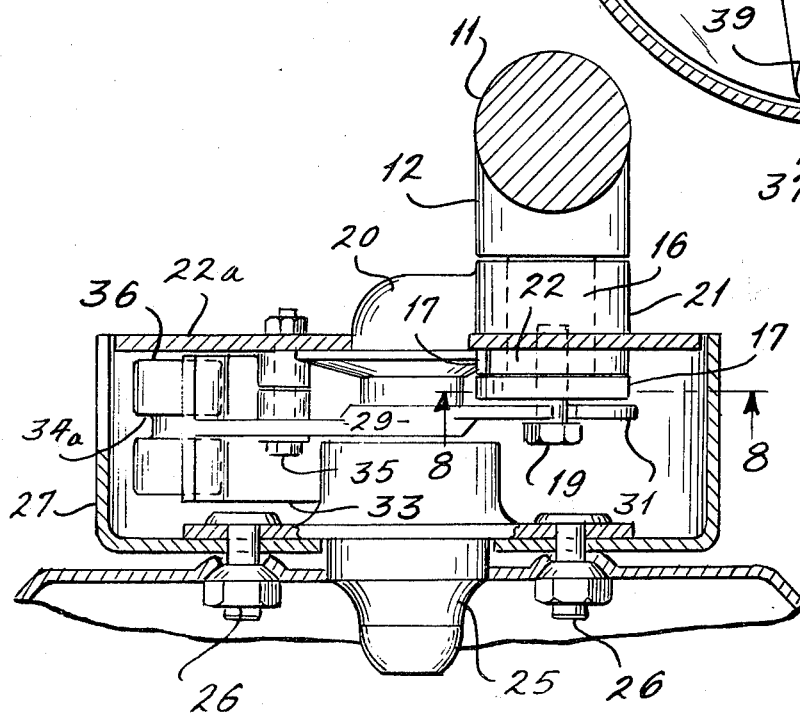
FIG. 7 is a sectional view taken along the lines 7—7 of FIG. 5, showing the lagging and angular relationship between the first and second axles of the wheel assembly as the vehicle is moving in the reverse direction.

The mechanism for effecting a shifting of each wheel assembly 4, as when the carriage changes direction, that is, either from forward to reverse, or reverse to forward, is also disclosed in FIGS. 3, and 5 through 9. In viewing FIGS. 5 and 6, there is disclosed a camming member 29 which is formed having a central aperature 30 designed for allowing its loose mounting surrounding the second axle 20, and more particularly its end 23. The upper portion 31 of said camming member is provided with an elongated slot 32 which is designed for maintaining a loose sliding engagement with respect to the inserted bolt 19, as previously identified. The downward portion of the camming member 29 is provided with a cam surface 33, and this portion of the member is pivotally mounted with respect to the wheel plate 22a (See FIG. 3) by means of a bolt 35. The relationship of the bolt 35 in pivotally mounting the camming member 29 to the plate 22a is also depicted in FIG. 7. Hence, the loose mounting of this camming member 29 with respect to the axle 20 provides sufficient play to allow for the wheel assembly 4 to move from a position of lag with respect to the axle 12 when moving in reverse, as shown in FIG. 5, to the position of opposite lag as when the carriage is moving is a forward direction, as shown in FIG. 6.

The camming surface 33 provided along the downward edge of the camming member 29 is positioned for accommodating a roller or follower 36 that provides the necessary friction for temporarily locking the member 29 with respect to the wheel drum 27 when it is desired to reverse the lagging position of the wheel assembly 4, as when the carriage reverse its direction of movement. It can be seen in FIG. 5, in which position the carriage is now moving in the reverse direction, that as the carriage moves in reverse, and its wheel rotates in the clockwise direction, the roller 36 positioned intermediate the drum 27 and the camming surface 33 will continue to maintain freedom and be urged in the clockwise direction, upwardly into the more open spacing between the drum and surface, so that the wheel 4 may freely turn during carriage movement. But, since the distance between the camming surface 33 and the interior of the drum surface 27 is normally maintained slightly less than the diameter of the roller 36, in the downward portions, as the movement of the vehicle is changed, such as to initiate its forward travel, thereby effecting a counter clockwise direction of turn of the wheel assembly 4, the roller 36 will tightly bind between the cam and drum surfaces, temporarily locking them together, to thereby cause the camming member 29 to flip over into the position as disclosed in FIG. 6, thereby disposing the second axle 20 in a position once again lagging the first axle 12 while the vehicle is moving in the forward direction, or to the left of the position shown in said FIG. 6. Obviously, once the camming member 29 has reached the limits of its pivot in this direction, the roller 36 will once again gain freedom in its positioning between the cam and drum surfaces 33 and 27, respectively, and be continually urged or rolled upwardly in a counterclockwise direction as the vehicle moves forward. It can be seen in FIGS. 5 and 6 that the loose mounting of the camming member 29 with respect to the axle 20 is such that when the wheel assembly 4 becomes positioned in its full extent of lag, regardless of the direction of movement of the vehicle, that the spacing between camming surface 33 and the interior surface of the wheel drum 27 is always of a lesser dimension at its downward locations, as shown in 37, then the dimension between these two surfaces at the opposite end of the camming member 29, as pointed out at 38. Hence, since the roller 36 is always of a greater diameter than this narrower dimension, as at 37, as the vehicle reverses its direction of travel, the roller through gravitational attraction will have a tendency to bind tightly into this narrower space thereby locking the camming member 29 with respect to the wheel drum and assembly 4, thereby allowing the entire wheel assembly to shift over from one position to the other, as from the position shown in FIG. 5, to its position shown in FIG. 6, or vice versa. At either end of the camming surface 33 there is provided an integral turn, that is shown at 39 and 40, to prevent the roller from escaping its confinement intermediate the camming surface and the drum surface. Also, to further guide the roller, the camming surface is provided with a track 34 that loosely fits in a roller groove 34a.

To achieve this partial translation of the camber angle of the wheels to acquire the toe-in relationship between the pair of front wheels 4, it is necessary that the axle 20 be shifted into this position of lag, as previously described. The amount of angular shifting of the axle 20 must be sufficient to provide at least enough transfer of angularity so that the combination of camber and toe-in will facilitate the directional guidance of the wheels 4 and the general manuverability of the carriage 1, particularly as the carriage is moved in reverse. It has been found that a most effective lagging angle is approximately between 30° and 45° off the vertical, such as shown in both FIGS. 5 and 6, although lesser or greater angles may achieve the same desirable results depending upon the amount of camber angle built into the wheel assemblies. As previously summarized, the significant principle of this invention is at least to achieve a combination of camber and toe-in angles simultaneously, regardless of the direction that the vehicle moves. To check the degree of lag that may be acquired by the wheel assemblies 4, the previously described stop means 17 that is rigidly mounted to the axle end 16 by means of the bolt 19 is provided with the pair of shoulder portions 18. Likewise, the previously described projecting portion 22 of the sleeve 21 is also provided with a pair of shoulder portions 41 and 42. As can be seen from FIG. 3, these shoulder portions are somewhat in alignment, and provided for selective engagement of each other so as to allow only limited pivoting and prevent the further turning of the camming member 29, and in general the wheel assembly 4, as when the assembly is shifting into a position of lag with respect to the first axle 12. These shoulder portions of these stop means are herein shown being arranged to provide for approximately a 45° turn to either side of the vertical, to effect the aforesaid lagging relationship, although, as previously described, other degrees of lag may work just as effectively depending upon the design of the wheel assembly, the amount of camber desired, in addition to the degree of toe-in efficient for the particular carriage design.

The foregoing provides a description of a wagon assembly that achieves both camber and toe-in simultaneously in wheel design for a carriage, or other vehicle, in either direction of movement. Other variations in the design of this invention may be considered by those skilled in the art in light of the foregoing disclosure. For example, applicant summarized the various forms of angular bends that could be built into the formation of the first or second axles of his invention, so as to provide the necessary camber angle particularly when the wheel assembly reaches the limits of its position of lag, in addition to translating this camber angle into some degree of toe-in of the same wheel assembly. Obviously other variations considered by those skilled in the art and which may be derived from this disclosure is desirably to be protected by the appended claims.

Having thus described the invention what is claimed and desired to be protected by Letters Patent is:

1. In facilitating the directional movement of a vehicle through the arrangement of its front wheel assemblies to follow a guided course of travel comprising, a vehicle including a supporting frame for mounting of its wheel assemblies, each wheel assembly including a first axle pivotally mounting to said frame and maintaining an angular relationship with the frame to which it mounts to thereby achieve wheel camber, a second axle rotatably supporting a wheel and being mounted for limited forward and reverse pivotal movement to said first axle to thereby achieve wheel toe-in in the direction of vehicle movement.

2. The invention of claim 1 wherein said first axle includes a stop means fixed to its end, said second axle having a sleeve means formed on one end and being mounted for limited pivotal movement upon the end of said first axle, said sleeve including a shoulder means cooperating with said stop means to limit the extent of the forward and reverse pivot of said second axle.

3. The invention of claim 2 and including a camming member loosely mounted with respect to said second axle, said wheel having a drum connecting thereto and disposed surrounding said second axle and camming member, and a roller arranged intermediate said camming member and drum to effect the limited forward and reverse pivot of said second axle as the vehicle initiates movement in an opposite direction.

4. The invention of claim 3 wherein said camming member includes a track, and said roller is formed having a corresponding groove to ride upon said cam track.

5. In the method of facilitating the directional movement of a vehicle through the arrangement of its wheels to follow a guided course of movement comprising, mounting a front pair of wheels upon the vehicle to achieve camber wherein said wheels are closer together at the bottom than at the top, pivotally mounting the axle supporting each wheel whereby the axle leads the wheel and achieves toe-in in the direction of vehicle movement, and moving said vehicle to simultaneously achieve camber and toe-in to enhance vehicle guidance.

6. In facilitating the directional movement of a vehicle through the arrangement of its front wheel assemblies to follow a guided course of travel comprising, a vehicle including a supporting frame for mounting of said wheel assemblies, each wheel assembly including a pair of axles, a first axle being pivotally mounted to said frame, a second axle rotatably supporting a wheel and being mounted for limited forward and reverse pivotal movement to said first axle, one of said axles maintaining an angular relationship with respect to said frame to achieve camber of the mounted wheel, whereby said wheel camber translates partially into wheel toe-in as the second axle reaches the limit of its pivotal movement.

* * * * *